United States Patent [19]
Fell, Sr.

[11] Patent Number: 5,388,288
[45] Date of Patent: Feb. 14, 1995

[54] PLUMBING TEST AND TRAP FITTING

[76] Inventor: Donnie R. Fell, Sr., 3500 Tates Creek Rd., Lexington, Ky. 40517

[21] Appl. No.: 65,652

[22] Filed: May 21, 1993

[51] Int. Cl.⁶ .............................................. F16L 55/11
[52] U.S. Cl. ........................................ 4/679; 4/696; 138/90; 285/901
[58] Field of Search ............... 138/89.3, 89.4, 90, 138/94, 97, 92, 89; 4/661, 679, 696; 285/901, 15, 16, 17, 4

[56] References Cited

U.S. PATENT DOCUMENTS

| | | |
|---|---|---|
| 848,759 | 4/1907 | Mern . |
| 880,436 | 2/1908 | Ayres . |
| 1,559,704 | 11/1925 | Hubbard . |
| 1,684,571 | 9/1928 | Boosey ........................ 285/4 |
| 1,684,572 | 9/1928 | Boosey ........................ 285/4 |
| 1,873,274 | 8/1932 | Boosey ........................ 138/90 |
| 1,951,645 | 3/1934 | Boosey ........................ 285/4 |
| 1,985,733 | 12/1934 | Koester . |
| 2,840,113 | 6/1958 | Simpson et al. . |
| 3,326,243 | 6/1967 | Augustus . |
| 3,968,000 | 7/1976 | Carroll et al. ............... 138/89 |
| 4,122,592 | 10/1978 | Ehret et al. . |
| 4,235,259 | 11/1980 | Hudock ....................... 138/97 |
| 4,457,542 | 7/1984 | Shaefer et al. ............. 285/901 |
| 4,513,786 | 4/1985 | Sodergren et al. ........... 138/89 |
| 4,763,510 | 8/1988 | Palmer ......................... 138/90 |
| 4,858,652 | 8/1989 | Bobichon et al. ............ 138/92 |

Primary Examiner—Henry J. Recla
Assistant Examiner—Charles R. Eloshway
Attorney, Agent, or Firm—Frost & Jacobs

[57] ABSTRACT

A plumbing fitting serving both as a test closure and a trap bushing for a T-fitting. The test and trap fitting comprises a tubular member of circular cross section having an open end and an integrally closed end. The fitting can be inserted through an opening in a wall (if present) and into the intermediate port of a T-fitting constituting a pan of a soil pipe and a vent pipe assembly. The test and trap fitting has an outside diameter such that it is received in the intermediate port of the T-fitting with close tolerance, enabling a fluid-tight connection to be made in any appropriate manner such as by solvent welding. The test and trap fitting serves as a closure for the intermediate port of the T-fitting enabling pressure testing of the plumbing system, or the maintenance of head of water therein. The test and trap fitting can be cut substantially flush with the wall and serves as bushing to which a plumbing fixture trap can be connected in fluid-tight fashion by solvent welding and the like. The test and trap fitting can be reused until the majority of its length is consumed.

17 Claims, 3 Drawing Sheets

PLUMBING TEST AND TRAP FITTING

TECHNICAL FIELD

The invention relates to a plumbing fitting, and more particularly to a plumbing fitting which serves both as a test closure and as a trap bushing for a conventional T-fitting.

BACKGROUND ART

In the construction of a home or building, it is usual practice to provide a T-fitting wherever a fixture of the type having a trap is to be located. The T-fitting comprises a part of a soil pipe and vent pipe assembly as is well-known in the art. The trap of the fixture is normally connected to the center port of the T-fitting. In the case of a lavatory or the like, this connection is made through an appropriate hole in the wall behind which the T-fitting is located and in front of which the lavatory is mounted.

In the pumbing industry today, it is common to make piping such as soil pipe and vent pipe, and fittings such as T-fittings, traps, and the like out of plastic material. The most commonly used plastic material for such applications is acrylonitrile-butadiene-styrene (ABS) or polyvinylchloride (PVC). The present invention is directed to plastic piping and fittings.

In a typical 2½ bath home there will probably be 10 or more T-fittings for connection to the traps of one or more lavatories, one or more showers, one or more bathtubs, a kitchen sink, a washing machine drain, and the like.

During construction, the basic plumbing is generally installed, quite some time before the installation of the various fixtures. As a consequence, the intermediate ports of the T-fittings will not have traps connected thereto for some time. It is therefore desireable to close and seal the intermediate ports of the T-fittings for several reasons. First of all, it helps prevent clogging of the basic plumbing with dirt and foreign material which might inadvertently enter these intermediate ports during construction. Furthermore, during plumbing construction it is frequently desireable or required to perform an air test or a water test to assure that the various joints are properly connected and fluid-tight.

The closing and sealing of the intermediate ports of the T-fittings has been accomplished by the prior art in a number of different ways. One common approach is to insert a length of pipe through the hole in the wall and into the intermediate port of the T-fitting, permanently adhering the pipe to the intermediate port by gluing, solvent welding, or the like. This provides a fluid-tight connection. The free end of the pipe is then closed by a wafer cap. The wafer cap comprises a relatively thin plastic cap, solvent welded or otherwise sealingly affixed to the free end of the pipe. The necessary cleaning and welding steps are time consuming. Furthermore, while the air or water tests are performed at relatively low pressures, the wafer caps are characterized by a failure rate of from about 30% to about 35%.

Another prior art approach is to apply to the end of the pipe attached to the center port of the T-fitting, a resilient rubber cap held in place by a hose clamp. Unlike the wafer cap, this type of closure has the advantage of being reusable. Nevertheless, its installation is time consuming, it is frequently lost or misplaced, and it, too, demonstrates a relatively high failure rate.

Most basic plumbing of the type to which the present invention is directed is accomplished with so-called "schedule 40" pipe and pipe fittings. Pipe and fittings of this type are conventional, readily available and well-known in the art. The term "schedule 40" refers to the thickness or gauge of the pipe wall.

Yet another approach by prior art workers is to close the free end of the pipe, extending from the center port of the T-fitting through the wall, by a schedule 40 cap. This is a relatively heavy-duty cap structure which is glued or solvent welded to the free end of the pipe. The cap is expensive and constitutes a single use item.

The present invention relates to a fitting for closing and sealing the intermediate port of the T-fitting while overcoming the problems associated with the various prior art devices for this purpose. Once installed, the fitting of the present invention will easily withstand a head of water or a water test or air test. In addition to this, the fitting can be cut substantially flush with the wall and will serve as a bushing for both tubular and schedule 40 traps. That portion of the fitting which was cut off can be used again. This is true until the length of the fitting is substantially consumed. The fitting is characterized by excellent strength, since its wall thickness is greater than that of schedule 40 pipe and fittings. The device of the present invention is easy and inexpensive to manfacture. Use of the fitting requires less time and fewer manipulative steps. The fitting of the present invention eliminates the necessity for a trap adapter. Prior to trap installation, the test and trap fitting of the present invention provides a closing and sealing device for the intermediate port of the T-fitting which is both reliable and safe.

DISCLOSURE OF THE INVENTION

According to the invention, there is provided a plumbing test and trap fitting which serves both as a closing and sealing means for the intermediate port of the T-fitting of a soil pipe and vent pipe assembly prior to trap installation, and as a trap bushing for connection of a trap to the T-fitting center port.

The test and trap fitting comprises a tubular member made of plastic material. The fitting has a circular cross section. The fitting is further characterized by an open end and an integrally closed end. As used herein and in the claims, the phrase "integrally closed end" refers to the fact that the closed end is the result of the manner in which the fitting is made. The closed end is not a separate member, but rather is an integral, one-piece pan of the test and trap fitting.

The open end of the fitting is inserted through an opening in the wall (if present) and into the center port of the T-fitting of a soil pipe and vent pipe assembly. The open end of the fitting is affixed in the T-fitting center port in fluid-tight fashion in any appropriate way, as by gluing, solvent welding, or the like. Prior to installation of a fixture trap, the test and trap fitting serves as a sealed closure for the intermediate port of the T-fitting of the soil pipe and vent pipe assembly, enabling maintenance of a head of water in the plumbing system, and enabling air or water pressure testing therein.

When it is time to install a fixture, that portion of the test and trap fitting extending forwardly of the wall is cut off, usually substantially flush with the wall. The cut-off portion of the test and trap fitting can be reused until its length is consumed. That portion of the test and trap fitting sealingly affixed to the T-fitting of the soil pipe and vent pipe assembly serves as a bushing to which the fixture trap can be connected in a fluid-tight fashion, again by gluing, solvent welding and the like.

DETAILED DESCRIPTION OF THE INVENTION

Figure 1:
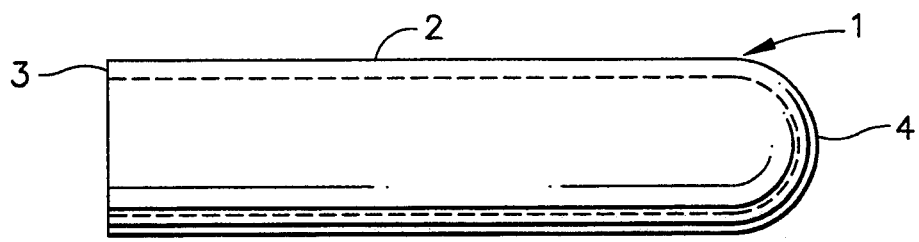
FIG. 1 is a side elevational view of the test and trap fitting of the present invention.
Figure 2:
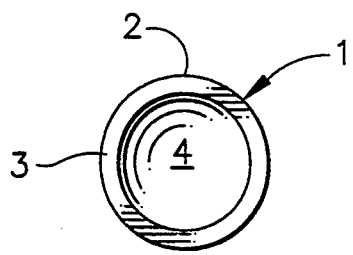
FIG. 2 is an end view of the test and trap fitting, as seen from the left in FIG. 1.

Reference is first made to FIGS. 1 and 2, wherein the test and trap fitting of the present invention is generally indicated at 1. The fitting 1 has a tubular body 2 with an open end 3 and a closed end 4 comprising an integral, one-piece part of the fitting 1. As is best shown in FIG. 2, the fitting 1 is circular in cross section.

The fitting 1 is intended for use with conventional plastic plumbing piping and fittings, and lends itself well to being moulded of ABS or PVC plastic material.

Figure 3:
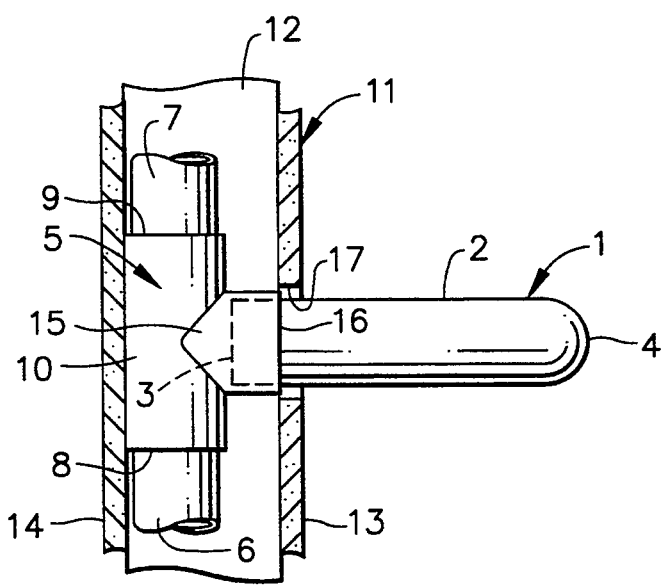
FIG. 3 is a fragmentary view, partly in cross section, illustrating the test and trap fitting of the present invention serving as a fluid-tight closure for the intermediate port of the soil pipe and vent pipe assembly T-fitting.

Reference is now made to FIG. 3 wherein an exemplary installation of the fitting 1 is illustrated. A conventional soil pipe and vent pipe assembly is shown, generally indicated at 5. The assembly 5 comprises a soil pipe 6 and a vent pipe 7 connected to the aligned ports 8 and 9, respectively, of a T-fitting 10. The soil pipe and vent pipe assembly 5 is shown mounted within a partition wall generally indicated at 11. The partition wall 11 comprises a plurality of vertical joists, one of which is shown at 12, supporting drywall panels 13 and 14.

The T-fitting 10 has a center branch 15 providing a center port 16. The T-fitting center port 16 is accessible through a hole 17 cut in the wall panel 13.

For purposes of this exemplary showing, let it be assumed that the soil pipe 6 and the vent pipe 7 are well known and readily available 1.5 inch (nominal internal diameter) schedule 40 plastic pipes, and that the T-fitting 10 is a schedule 40 T-fitting therefor. As a consequence, all three T-fitting ports 8, 9 and 16 have an internal diameter to just nicely receive the outside diameter of the 1.5 inch schedule 40 pipe with close tolerance, enabling fluid-tight connections between soil pipe 6, vent pipe 7 and T-fitting 10 by solvent welding or the like.

The test and trap fitting 1 of the present invention has an outside diameter equivalent to the outside diameters of pipes 6 and 7 (i.e. about 1.900 inches). As a result, its open end 3 is receivable within the center port 16 of T-fitting 10 with a close tolerance enabling a fluid-tight connection, again by solvent welding or the like. The body 2 of the test and trap fitting 1 extends through the wall panel hole 17. With the test and trap fitting 1 installed as shown in FIG. 3, the T-fitting 10 is in condition to withstand a head of water, or air or water pressure testing.

Figure 4:
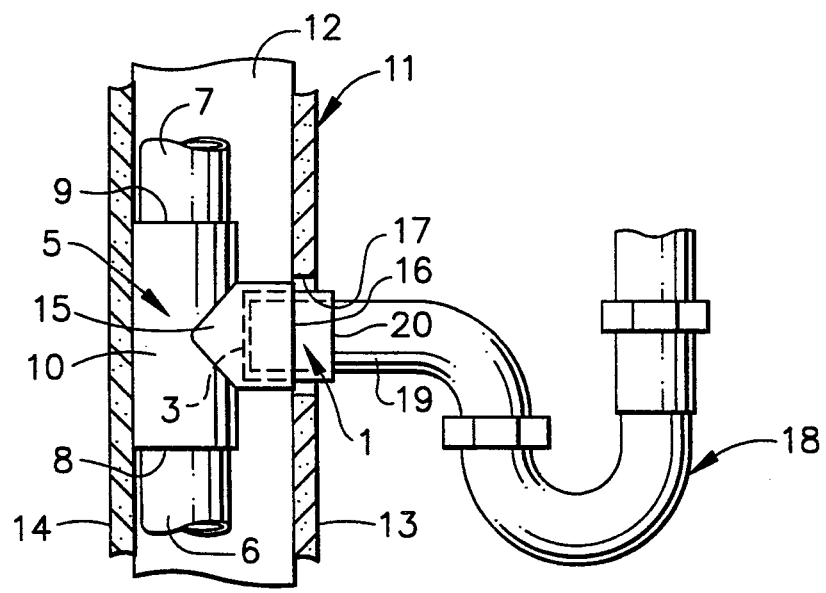
FIG. 4 is a fragmentary view, partly in cross section, illustrating the test and trap fitting serving as a bushing for a tubular trap.

Reference is now made to FIG. 4, wherein like parts are given like index numerals. FIG. 4 illustrates the connection of a conventional tubular trap (generally indicated at 18) to the T-fitting 10. A conventional tubular trap, such as trap 18, is used with a lavatory, a kitchen sink, and the like. That portion 19 of tubular trap 18 to be connected to T-fitting 10 has an outside diameter of about 1.5 inches.

As is indicated in FIG. 4, the test and trap fitting 1 is cut as at 20. The cut 20 is made as near flush to drywall panel 13 as is feasible. The remainder of the test and trap fitting 1 may be reused in the manner described with respect to FIG. 3. The number of times the test and trap fitting 1 can be reused depends upon the length of the fitting. While the fitting 1 can be made of any convenient length, a length of about 8 inches is preferred. Such a length usually enables test and trap the fitting to be reused between two and four times, depending upon the nature of the installations.

It will be remembered that the fitting 1 has an outside diameter substantially equal to the outside diameter of schedule 40 pipes 6 and 7 and is received in the T-fitting intermediate port 16 with a close tolerance fit so that a fluid tight joint therebetween can be achieved by gluing, solvent welding, or the like. The inside diameter of fitting 1 is such as to receive the member 19 of tubular trap 18 with a close tolerance fit (i.e. about 1.505 inches), so that a fluid-tight connection may be made between the member 19 and the fitting 1 by gluing, solvent welding or the like.

In prior art installations of this nature, a piece of schedule 40 pipe equivalent to pipe 6 or pipe 7 is affixed to T-fitting port 16 in a fluid-tight fashion. The inner diameter of such schedule 40 pipe, however, does not accommodate the member 19 of tubular trap 18 with a close tolerance fit. As a consequence, an adapter is required. The adapter is rather bulky, which diminishes the appearance of the installation, when completed.

Figure 5:
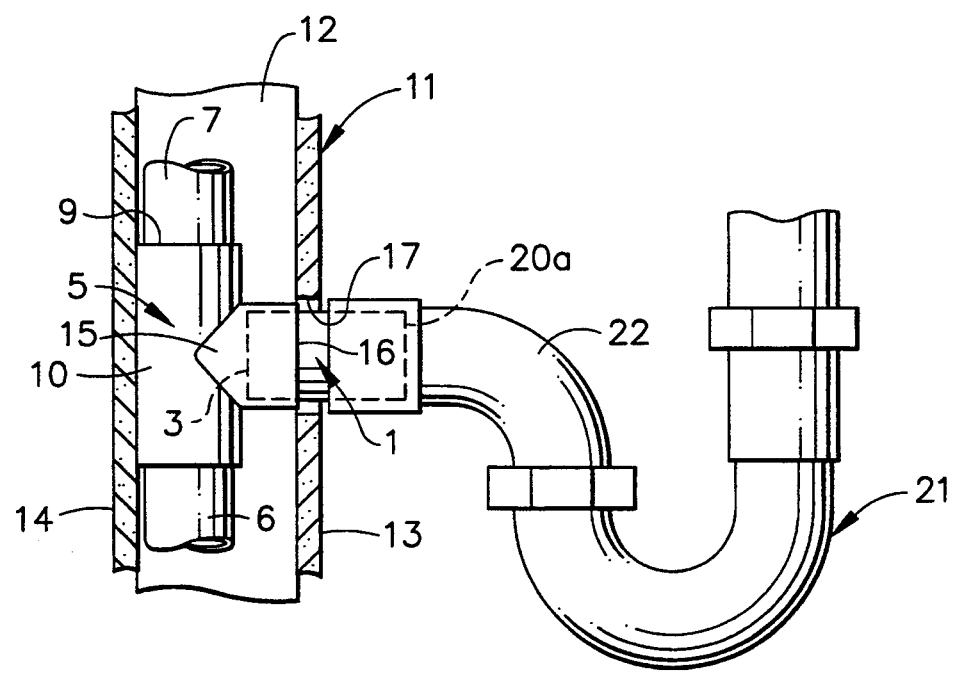
FIG. 5 is a fragmentary view, partly in cross section, illustrating the test and trap fitting serving as a bushing for a schedule 40 trap.

Reference is now made to FIG. 5. Like parts have once again been given like index numerals. FIG. 5 illustrates the use of the test and trap fitting 1 of the present invention to connect a schedule 40 trap (generally indicated at 21) to the T-fitting 10. The schedule 40 trap 21 is also a conventional, readily available fitting and is used with such fixtures as showers, bathtubs, washing machine drain systems, laundry tubs and the like. It will be understood by one skilled in the art that the T-fitting of the soil pipe and vent pipe assembly for fixtures such as tubs and showers will be located beneath the floor, rather than within a wall. the use of the test and trap fitting 1 of the present invention is the same in either case.

The schedule 40 trap 21 has an element 22 similar to the element 19 of FIG. 4. That end of element 22 to be connected to the intermediate port 16 has an internal diameter identical to the internal diameter of intermediate port 16. Once again, the test and trap fitting 1 of the present invention is cut as at 20a. Since the internal diameter of element 22 is identical to the internal diameter of port 16, the fitting 1 will also have a close tolerance fit within the element 22 and a fluid-tight connection can be made therebetween by gluing, solvent welding or the like.

In the above description, the test and trap fitting 1 is used with 1.5 inch schedule 40 pipe. The size of the pipe used is not a limitation. Two inch (nominal internal diameter) schedule 40 pipe is also commonly used in such an instance, the test and trap fitting 1 of the present invention would be made with a length of about 8 inches, an internal diameter of about 2.067 inches and an external diameter of about 2.375 inches.

From the above description, it will be apparent that the fitting 1 of the present invention can serve both as a sealed closure for the intermediate port 16 of T-fitting 10, and is also capable of serving as a connecting bushing for both a tubular trap such as trap 18, or a schedule 40 trap, such as trap 21.

Figure 6:
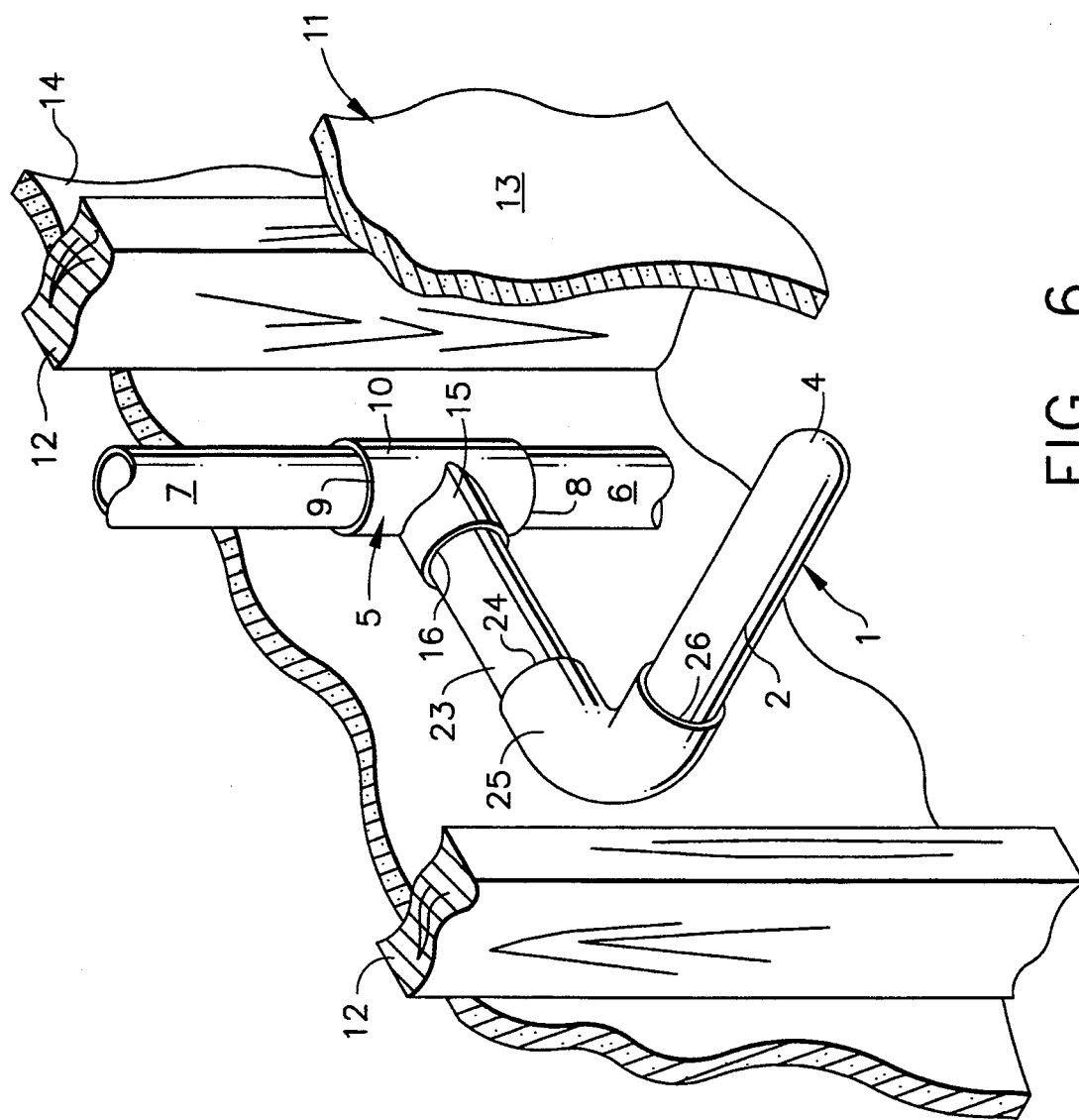
FIG. 6 is a fragmentary isometric view illustrating the test and trap fitting used with a plumbing elbow.

There are occasions when the soil pipe and vent pipe assembly 5 is not located in alignment with the desired position of the fixture. Such an instance is illustrated in FIG. 6, where like parts have been given like index numerals. Under these circumstances, the soil pipe and vent pipe assembly is arranged with the center branch 15 of the T-fitting 10 oriented parallel to wall panels 13 and 14. The center port 16 of T-fitting 10 has a section of pipe 23 sealingly affixed therein by solvent welding or the like. Similarly, the free end of pipe section 23 is sealingly affixed in the port 24 of a plumbing elbow 25. It will be noted that the other port 26 of elbow 25 faces wall panel 13 and may be made accessible therethrough by an appropriate hole (not shown) formed in wall panel 13, similar to hole 17 of FIGS. 3, 4 and 5. The precise desired position of the fixture will dictate the length of pipe section 23. The use of the test and trap fitting 1 will be identical to that described with respect to FIGS. 3, 4 and 5 with the exception that the fitting will be used in conjunction with the port 26 of elbow 25, rather than the port 16 of T-fitting 10. In one instance, the port 16 of T-fitting 10 constitutes the intermediate port of the soil pipe and vent pipe assembly 5. In the other instance, the port 26 of elbow 25 constitutes the intermediate port of the soil pipe and vent pipe assembly.

Modifications may be made in the invention without departing from the spirit of it.

What is claimed:

1. A plumbing fitting in combination with a soil pipe and vent pipe assembly, said assembly having an intermediate port, said plumbing fitting comprising a test closure, said test closure being a tubular member of circular cross section terminating in an open end and an opposite integrally closed end, said open end of said fitting being slidably received within said intermediate assembly port with a close tolerance fit, means for sealing said open end of said fitting in said intermediate port in fluid-tight fashion capable of withstanding air and water testing of said assembly, and a trap; whereby, upon completion of said testing, said fitting is severable via an appropriate cutting means into a first portion, which remains connected to said intermediate port and has a free end extending a desired distance from said intermediate port, and a second portion, said trap being attached to said fee end in a close tolerance fit; wherein, said second portion, which includes said closed end, is capable of being reused.

2. The plumbing fitting claimed in claim 1 wherein said fitting, said soil pipe and vent pipe assembly and said trap are formed of plastic material.

3. The plumbing fitting claimed in claim 2 wherein said plastic material is chosen from the class consisting of ABS and PVC.

4. The plumbing fitting claimed in claim 2 wherein said means for sealing is chosen from the class consisting of adhesives and solvents.

5. The plumbing fitting claimed in claim 1 wherein said soil pipe and vent pipe assembly comprises a soil pipe and a vent pipe joined by a T-fitting, said T-fitting having a center port comprising said intermediate port of said soil pipe and vent pipe assembly.

6. The plumbing fitting claimed in claim 5 wherein said fitting, said soil pipe and vent pipe assembly and said trap are formed of plastic material.

7. The plumbing fitting claimed in claim 6 wherein said soil pipe and said vent pipe comprise 1.5 inch schedule 40 pipe, said T-fitting comprises a schedule 40 T-fitting for use with said 1.5 inch schedule 40 pipe, said plumbing fitting having an outside diameter equal to the outside diameter of said 1.5 inch schedule 40 pipe, said trap being a schedule 40 trap for use with 1.5 inch schedule 40 pipe, said free end of said first portion of said fitting being received within an end of said trap with a close tolerance fit.

8. The plumbing fitting claimed in claim 6 wherein said soil pipe and said vent pipe comprise 1.5 inch schedule 40 pipe, said T-fitting comprises a schedule 40 T-fitting for use with said 1.5 inch schedule 40 pipe, said plumbing fitting having an outside diameter equal to the outside diameter of said 1.5 inch schedule 40 pipe, said trap being a tubular trap, said fitting having an internal diameter approximately the diameter of an end of said trap, said end of said trap being received within said free end of said first portion of said fitting with a close tolerance fit.

9. The plumbing fitting claimed in claim 6 wherein said soil pipe and said vent pipe comprise 2 inch schedule 40 pipe, said T-fitting comprises a schedule 40 T-fitting for use with 2 inch schedule 40 pipe, said plumbing fitting having an outside diamter equal to the outside diameter of said 2 inch schedule 40 pipe, said trap being a schedule 40 trap for use with 2 inch schedule 40 pipe, said free end of said first portion of said fitting being received within an end of said trap with a close tolerance fit.

10. The plumbing fitting claimed in claim 1 wherein said soil pipe and vent pipe assembly comprises a soil pipe and a vent pipe joined by a T-fitting, said T-fitting having a center port, a pipe section having first and second ends, said first end of said pipe section being connected to said center port of said T-fitting, an elbow having first and second ports, said second end of said pipe section being connected to said first port of said elbow, said second port of said elbow comprising said intermediate port of said soil pipe and vent pipe assembly.

11. The plumbing fitting claimed in claim 10 wherein said fitting, said soil pipe and vent pipe assembly and said trap are formed of plastic material.

12. The plumbing fitting claimed in claim 11 wherein said soil pipe, said vent pipe, and said pipe section comprise 1.5 inch schedule 40 pipe, said T-fitting and said elbow comprise schedule 40 fittings for use with said 1.5 inch schedule 40 pipe, said plumbing fitting having an outside diameter equal to the outside diameter of said 1.5 inch schedule 40 pipe, said trap being a schedule 40 trap for use with 1.5 inch schedule 40 pipe, said free end of said first portion of said fitting being received within an end of said trap with a close tolerance fit.

13. The plumbing fitting claimed in claim 11 wherein said soil pipe, said vent pipe, and said pipe section comprise 1.5 inch schedule 40 pipe, said T-fitting and said elbow comprise schedule 40 fittings for use with said 1.5 inch schedule 40 pipe, said plumbing fitting having an outside diameter equal to the outside diameter of said 1.5 inch schedule 40 pipe, said trap being a tubular trap, said fitting having an internal diameter approximating the diameter of an end of said trap, an end of said trap being received within said free end of said first portion of said fitting with a close tolerance fit.

14. The plumbing fitting claimed in claim 11 wherein said soil pipe, said vent pipe and said pipe section comprise 2 inch schedule 40 pipe, said T-fitting and said elbow comprise schedule 40 fittings for use with 2 inch schedule 40 pipe, said plumbing fitting having an outside diameter equal to the outside diameter of said 2 inch schedule 40 pipe, said trap being a schedule 40 trap for use with 2 inch schedule 40 pipe, said free end of said first portion of said fitting being received within an end of said trap with a close tolerance fit.

15. The plumbing fitting claimed in claim 1 wherein said free end of said first portion of said fitting is received within an end of said trap.

16. The plumbing fitting claimed in claim 1 wherein an end of said trap is received within said free end of said first portion of said fitting.

17. The plumbing fitting claimed in claim 1 wherein said fitting is formed of plastic material chosen from the class consisting of ABS and PVC.

* * * * *